Oct. 31, 1967 P. VULLIEZ 3,349,632
DEVICE FOR THE TRANSMISSION OF MOVEMENTS
Filed Feb. 3, 1966

3,349,632
DEVICE FOR THE TRANSMISSION
OF MOVEMENTS
Paul Vulliez, Pont-Audemer, France, assignor of one-half to Commissariat à l'Energie Atomique, Paris, France
Filed Feb. 3, 1966, Ser. No. 524,695
Claims priority, application France, Feb. 19, 1965, 6,185
2 Claims. (Cl. 74—89.15)

This invention relates to an improved device for the transmission of movements which is of particular interest for the purpose of controlling a valve gate.

The device in accordance with the invention makes it possible in particular to effect the automatic closure of a valve both rapidly and efficiently by means of a single movement of rotation which is carried out at uniform speed. By means of said device, a uniform movement of rotation can be transformed into a variable-speed rectilineal movement of translation of the valve gate.

Said movement of translation can thus consist in a first stage of approach of the gate towards its seating at a relatively high speed, the resistances to be overcome during this stage being of a very low order, and a second stage in which the translational movement is carried out at a much lower speed with transmission of effort in such a manner as to apply the gate against its seating.

The present invention relates to a device for the transmission of movements comprising two coaxial shafts made fast for rotation respectively with two threaded bushings which are screwable one within the other, a first bushing being screwable in a stationary frame and the second bushing being made fast for translational motion with a controlled member, a positive-drive cam for driving and guiding two rollers which are integral respectively with said two shafts and means for driving said cam in rotation.

One particular form of embodiment of the device according to the invention will now be described in reference to FIGS. 1 and 2 of the accompanying drawings. The form of embodiment described has been chosen by way of example and is not intended to constitute any limitation of the invention.

Figure 1:
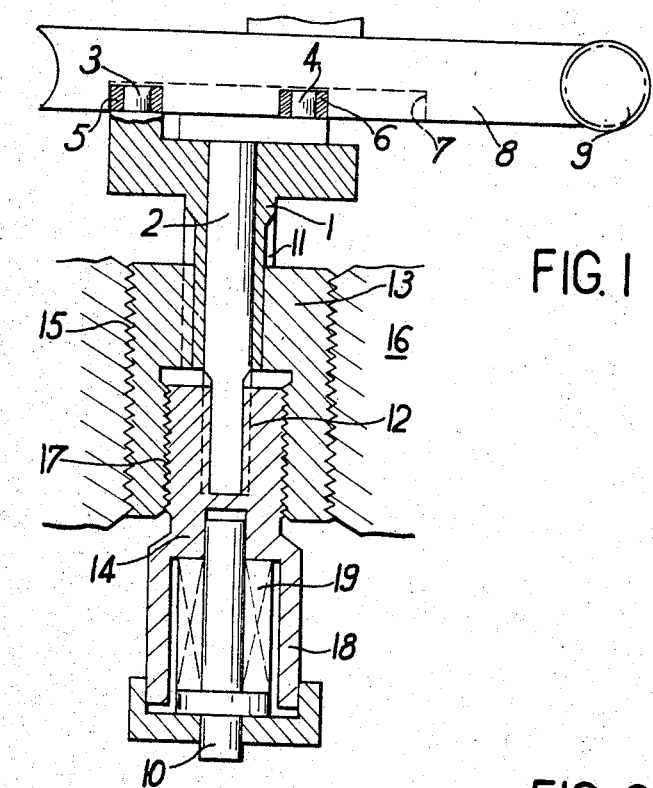
FIG. 1 represents a diagrammatic longitudinal sectional view of the device in accordance with the invention.

The device of FIG. 1 is employed for the purpose of effecting and controlling the closure or opening of the gate of a valve (not shown) by means of a piston 10. Said device comprises two vertical coaxial shafts 1 and 2 which are capable of moving in rotation relatively to each other.

Said two shafts are provided with crank-pins 3 and 4 which are located at a same distance from their common axis and on which are fitted rollers 5 and 6 respectively. Said rollers are adapted to engage in a groove 7 which is cut in a horizontal wheel 8 and which constitutes the positive-drive cam which will be described in greater detail hereinafter.

The wheel 8 which is set off-center with respect to the shafts 1 and 2 can be driven in rotation about its axis by means of a wormscrew 9 which engages with a set of teeth located at the exterior of the wheel and which is driven by a motor (not shown in the drawings).

Each shaft, namely the outer shaft 1 and inner shaft 2, is provided with a splined shank 11 or 12 respectively which makes said shaft fast for rotation with a bushing 13 or 14 respectively. On the other hand, each bushing is nevertheless capable of carrying out movements of longitudinal displacement relatively to the corresponding shaft.

The bushing 13 is provided at its periphery with a screw-thread 15 which engages with a corresponding internal thread of the stationary valve case 16.

The second bushing 14 is also provided with an external screw-thread 17 and is thus capable of screwing into an internally-threaded bore of the first bushing 13. The screw-thread 17 has a much smaller pitch than the external thread 15 of the first bushing 13.

Said second bushing 14 is provided beyond the screw-thread 17 with a hollow cylindrical extension 18 which contains the piston 10. Said piston is integral with the gate of the control valve and is rotatably mounted with respect to the bushing 14. The translational movements of said bushing are transmitted to the piston 10 by means of an assembly of flexible washers 19 which holds the gate to its seating in the closed position.

The profile of the positive-drive cam 7 which drives the rollers 5 and 6 is so designed that, during the rotation of the wheel 8, it alternately initiates the rotation of one of the shafts 1 and 2 while the other shaft remains stationary. In a particular case which is shown by way of example in FIG. 2, the cam 7 comprises a central portion 20 formed by a semi-circle and two symmetrical end-portions 21 and 22 formed by circular arcs which are curved in opposite directions. The center of the semi-circle 20 coincides with the axis of rotation of the wheel 8 which carries the cam. In addition, the circular arcs 21 and 22 are such that, during the rotation of the wheel 8, the ends thereof describe a circle containing the circle 23 which is described by the rollers 5 and 6 about the axis 24 of the shafts.

Figure 2:
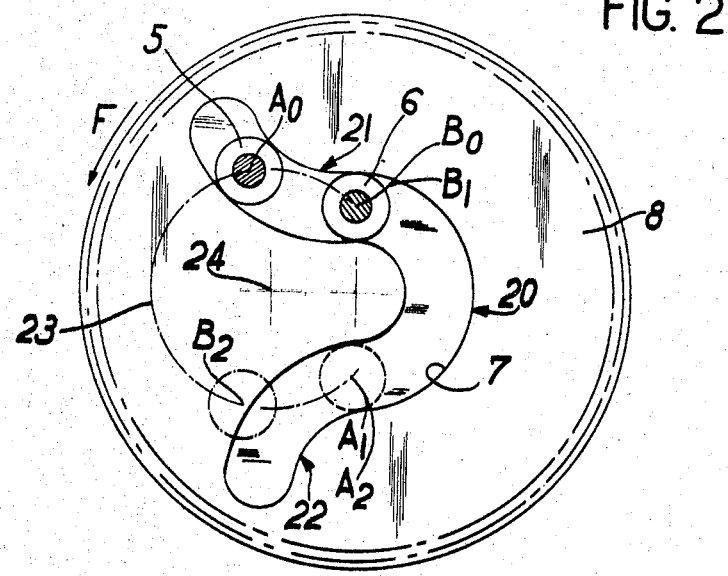
FIG. 2 shows the profile of the positive-drive cam.

When the valve is in the open position, the rollers 5 and 6 are located respectively in the positions indicated by the references $A_0$ and $B_0$ in FIG. 2, $A_0$ being located on the circular arc 21 of the cam and $B_0$ being located at the extremity of the semi-circle 20.

In order to produce the closure of the valve, the wheel 8 is driven in rotation in the direction of the arrow F. One virtually full revolution of the wheel corresponds to complete closure of the valve.

During a first stage of the movement which corresponds to the first half-revolution of the wheel 8, the roller 6 describes the semi-circle 20 while this latter rotates and its position $B_1$ at the end of the half-revolution coincides with $B_0$. The shaft 2 is therefore motionless and maintains the bushing in the same angular orientation. During said half-revolution of the wheel 8, the roller 5 is driven by the arc 21 of the cam and describes the circle 23 from $A_0$ to $A_1$, $A_1$ being diametrically opposite to $B_1$ on the semi-circle 20.

As the wheel 8 continues in its movement of rotation, the roller $A_1$ engages in its turn in the semi-circle and consequently remains motionless at $A_1$ during the second stage of the movement. The roller 6 is driven on the contrary by the end circular arc 22 of the cam from $B_1$ to $B_2$ along the circle 23.

Thus, during the first half-revolution of the wheel 8, the shaft 2 and therefore the bushing 14 are secured against rotation by the roller 6 whilst the outer shaft 1 is driven in rotation by the roller 5. By means of the splined shank 11, said shaft 1 drives the bushing 15 which screws into the valve case 16 and in turn drives the bushing 14 in translational motion. Since the screw-thread 15 has a great pitch compared with the screw-thread 17, the piston 10 moves down rapidly and thus brings the gate towards its seating.

During the second stage of the movement, the shaft 1 is in turn held motionless by the roller 5 whilst the inner shaft 2 is driven in rotation. Said shaft 2 accordingly rotates within the bushing 13 which is in turn maintained stationary. Since the screw-thread 17 has a small pitch, the downward motion of the piston then takes place slowly. The pressure with which the gate is applied against its seating is exerted at the end of travel by means of the flexible washers 19.

What we claim is:

1. Device for the transmission of movements comprising two coaxial shafts made fast for rotation respectively with two threaded bushings which are screwable one within the other, a first bushing being screwable in a stationary frame and the second bushing being made fast for translational motion with a controlled member, a positive drive-cam for driving and guiding two rollers which are respectively integral with said two shafts and means for driving said cam in rotation.

2. Device for the transmission of movements in accordance with claim 1, wherein said positive-drive cam has an undulated profile, one of the rollers being maintained stationary while the other roller describes a circular arc and conversely at the same time of rotation of the cam, with the result that a uniform movement of rotation of said cam produces a movement of translation of the controlled member at two different successive speeds.

References Cited

UNITED STATES PATENTS

| 2,019,158 | 10/1935 | Russell | 74—55 |
| 2,338,271 | 1/1944 | Ulanet | 74—424.8 |
| 2,871,723 | 2/1959 | Shephard | 74—55 |
| 2,977,814 | 4/1961 | Brunson | 74—424.8 |

FOREIGN PATENTS 76,955  6/1919  Germany.

MILTON KAUFMAN, *Primary Examiner.*

W. S. RATLIFF, *Assistant Examiner.*